United States Patent [19]

Jansen

[11] 4,340,918
[45] Jul. 20, 1982

[54] PIVOTED MAGNETIC HEAD MOUNT WITH ADJUSTABLE LIMIT

[75] Inventor: Herbert Jansen, Nuremberg, Fed. Rep. of Germany

[73] Assignee: GRUNDIG E.M.V. Elektro-Mechanische Versuchsanstalt Max Grundig, Fuerth, Fed. Rep. of Germany

[21] Appl. No.: 97,967

[22] Filed: Nov. 28, 1979

[30] Foreign Application Priority Data

Feb. 8, 1979 [DE] Fed. Rep. of Germany ....... 2904716

[51] Int. Cl.³ .......................... G11B 21/24; G11B 5/56
[52] U.S. Cl. ..................................... 360/109; 360/104
[58] Field of Search ................................. 360/104, 109

[56] References Cited

U.S. PATENT DOCUMENTS

| | | | |
|---|---|---|---|
| 2,783,311 | 2/1957 | Scott | 360/104 |
| 3,447,807 | 6/1969 | Mayer | 360/104 |
| 3,767,209 | 10/1973 | Seehawer | 360/129 |
| 3,940,796 | 2/1976 | Haun et al. | 360/109 |

FOREIGN PATENT DOCUMENTS 526006 12/1976 U.S.S.R. ............................. 360/104

OTHER PUBLICATIONS

Hickox, "Head Mount," IBM Tech. Disc. Bull., vol. 18, No. 2, Jul. 1975, p. 541.

*Primary Examiner*—Robert S. Tupper
*Attorney, Agent, or Firm*—Kane, Dalsimer, Kane, Sullivan and Kurucz

[57] ABSTRACT

A device for automatically adjusting a magnetic head to the position of a magnetic tape in an audio and/or video recording and/or playback apparatus having a magnetic head in contact with a portion of the magnetic tape during operation of the device, and a pivoting means supporting said head while allowing it to rotate so as to improve head-to-tape contact even when tape geometry and pressure varies.

7 Claims, 4 Drawing Figures

PIVOTED MAGNETIC HEAD MOUNT WITH ADJUSTABLE LIMIT

FIELD OF THE INVENTION

The invention relates to a magnetic head for audio and/or video recording and/or playback, and particularly to a means of automatically adjusting the position of the head with respect to the tape.

BACKGROUND OF THE INVENTION

In devices for audio and/or video recording and/or playback utilizing magnetic tape as the recording carrier, the recording and playback quality substantially depends upon a constant tape feed across the magnetic head, along with smooth tape to head contact. Many parts utilized in such devices influence the tape feeding i.e., a tape coil, tape deflection bolts, tape guiding rollers, tape contact pressure rollers, video head drum, erasure and audio head etc., and if not properly alligned would influence the tape feed in an undesired manner. This is true particularly with respect to the position of the magnetic head surface in contact with the tape. It is therefore desirable that there be provided an exact feeding of the tape along with an exact positioning of the magnetic head and particularly the magnetic head slot, with respect thereto; in addition to adjusting the head position, so as not to influence tape feed.

The magnetic head slot is usually adjusted to provide that it is exactly perpendicular to the feeding direction of the tape, while being adjusted properly heightwise relative to the tape. To accommodate these adjustments, the magnetic head is often mounted on an adjustable support or mounting plate. This plate is adjustble by way of a known means, for example, through adjustment screws and/or spring elements and heightwise guides etc., which allow for the adjusting of the mounted magnetic head in a heightwise manner while also providing a perpendicular adjustment with respect to the magnetic tape position.

However, even a magnetic head which is precisely adjusted with respect to the magnetic tape results in a partial reduction in recording and playback quality. This is due to inconsistency in the tape geometry resulting in uneven head-to-tape contact. An existing solution to compensate for the uneven head-to-tape contact involves the use of a contact pressure felt or a contact pressure tape to provide for a constant engagement of the magnetic tape to the magnetic head. Such an arrangement by its very nature is disadvantageous since the additional pressure on the magnetic head results in a washing out of the magnetic head or head surface. Accordingly, this washing out of the head surface may increase the frequency of head replacement while also resulting in changing the desired contact pressure thereby effecting the tape feed which immediately causes a reduction of quality in recording and playback of the device.

SUMMARY OF THE INVENTION

It is therefore an object of the invention to provide for a audio and/or video recording and playback device which has substantially improved head-to-tape contact, without the necessity of additional tape contact pressure means and which was not obtainable in hitherto known devices.

In this regard, the invention basically provides for a magnetic head which is pivotly mounted so as to automatically adjust to the tape position. The magnetic head is maintained in a somewhat free floating arrangement by opposite pivot bearing or points which may be pins, mounted so as to bear laterally against the opposite sides of the magnetic head, parallel to the tape feed. The pins may be supported by a magnetic head shielding container which, in turn, may be located on a mounting plate which would allow for initial perpendicular and heightwise adjustment of the magnetic head with respect to the tape feed.

By the foregoing arrangement, the magnetic head is allowed to rotationally move about the pivot pins during the tape feeding to pick up any inconsistency in tape geometry and thereby improve the head-to-tape contact without additional tape pressure causing means.

Thus, the aforenoted objects are advantageously realized, and other objects and advantages will become apparent from the following detailed description which is to be taken in conjunction with the corresponding drawings.

DETAIL DESCRIPTION OF THE DRAWINGS

Figure 1:
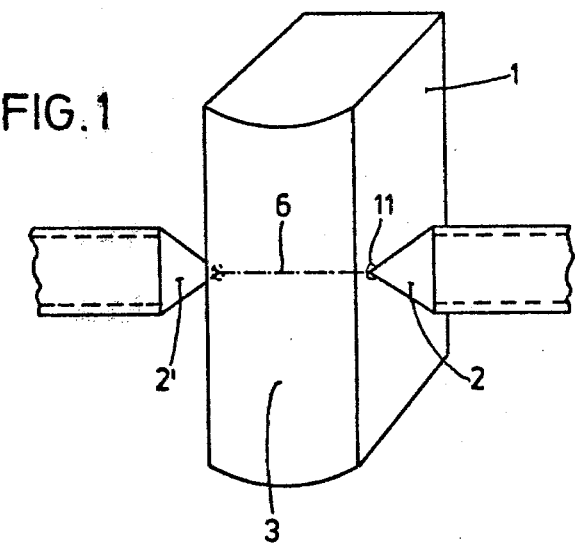
FIG. 1 depicts, in a simplistic manner, a magnetic head having opposite pivot pins in accordance with the present invention.

With regard now to FIG. 1, there is shown a magnetic head 1 in a simplified manner. The magnetic head 1 is coupled with a pivot bearing, which is in the form of two pivot points 2 and 2′, which engage the magnetic head on opposite sides. A face, or head surface 3, is shaped by rounding off the front face of the magnetic head and represents the position of the head portion that is adjacent to the magnetic tape during operation of the device. As shown, the opposite bearing pivots 2 and 2′ of the pivot bearing, meet a small distance from the head surface 3 at the horizontal center of the magnetic head. A preferred position for the pivot point on the magnetic head is such that the imaginary connecting line 6 between the bearing pivots 2, and 2′ is parallel and centered with respect to the magnetic tape so as to allow equally responsive rotation of the magnetic head resulting from tape pressure on either side of the imaginary line.

Figure 2:
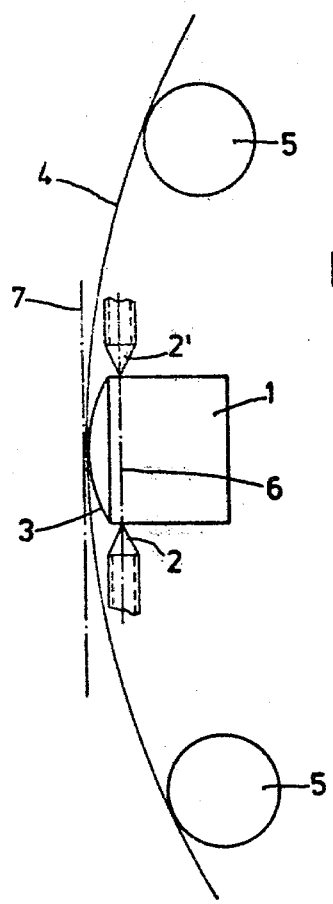
FIG. 2 is a plan, sectional view of the tape feed past the magnetic head in accordance with the present invention.

A sectional view of a segment of the tape feeding of the magnetic tape across the associated magnetic head is shown in FIG. 2. This involves a magnetic tape 4 which passes by the magnetic head 1 and corresponding head surface 3, by means of two tape guiding bolts 5. The imaginary connection line 6 between pivot points 2 and 2′ of the magnetic head is disposed parallel to a imaginary tangential line 7, which is the result of the tangent between the magnetic tape 4 and the head surface 3. As the magnetic tape 4 is fed past the magnetic head, variations in the tape geometry will cause the head to pivot about points 2 and 2′, to increase the head-to-tape contact. For example, if the variations in the tape geometry during the feed causes an increase pressure on the head surface adjacent the top portion of the tape, the magnetic head would rotate as a result of it in the direction of the pressure, with such rotation causing an increase head-to-tape contact on the opposite lower portion of the tape.

Figure 3:
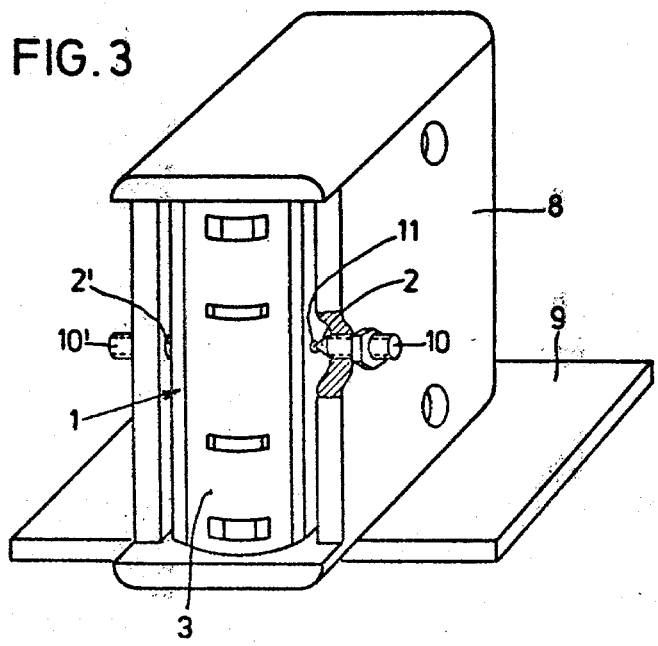
FIG. 3 is a perspective view of a magnetic head pivotly mounted in a shielding container.

In FIG. 3 there is shown one embodiment of a magnetic head 1 wherein it is inserted in a shielding container 8. The shielding container 8 may be screwed or mounted onto a support plate 9. As aforementioned, the support plate 9 is adjustably mounted in the device by a known means in such a manner that the magnetic head mounted thereon may be adjusted perpendicular as well as heightwise with respect to the magnetic tape. These adjustments are then supplemented by the present arrangement which allows for the automatic adjustment of the magnetic head due to its ability to rotationally move about points 2 and 2' which is responsive to variations in tape geometry and pressure, and thereby automatically adjusting the head position with respect thereto, increasing the head-to-tape contact.

The pivot bearing is pointed and should be relatively friction free and the pivot points 2 and 2' are shaped as adjustment screws 10 and 10'. These may be screwed or otherwise mounted into the shielding container 8. The bearing position 11 in the magnetic head 1 may be in the form of a sunk centre point or inserted bearing head and to enable the magnetic head to rotate in the shielding container, and it is necessary that a corresponding spatial coordination between the container and head be provided.

Figure 4:
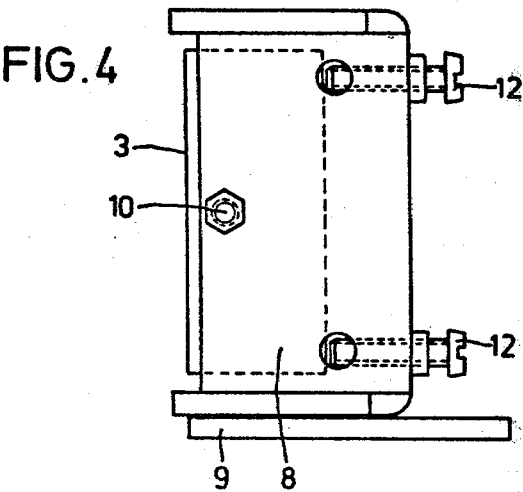
FIG. 4 is a side and somewhat sectional view of the magnetic head pivotly mounted in a shielding container.

This can be seen in FIG. 4, which also reveals that the shielding container 8 may be provided, at its rear side, with two adjustment screws 12. These two adjustment screws provide a control of the movability of the magnetic head in the shielding container and can be adjusted to the necessary requirements, i.e., the rotational limits desired provided by the screws.

While the embodiments of the magnetic head pivoting bearing are shown in the form of a pointed pivot bearing or pin, it should be understood that this is only one especially simple and advantageous bearing possibility and other types of pivot bearings suitable to this precision technique may be utilized. Although somewhat preferred embodiments of the invention have been disclosed and described in detail herein, it should be understood that this invention is no sense limited thereby and its scope should be determined by that of the appended claims.

What is claimed:

1. A device for automatically maintaining a magnetic head in transducing contact with a magnetic tape in a recording and/or playback apparatus with said device comprising;
   a magnetic head having a transducing surface for contact with the magnetic tape;
   mounting means supporting said head and allowing rotation of said head about an axis substantially parallel to the running direction of the tape adjacent to the head during operation of the apparatus; and
   adjustable limit means engageable with said head whereby the degree of the rotation of the head about said axis may be adjusted.

2. The device in accordance with claim 1 wherein said mounting means includes a shielding container and said adjustable limit means comprises screw means supported by the shielding container and adapted to engage said head and limit in an adjustable manner the rotation of the head.

3. The device in accordance with claim 2 which further includes an adjustble mounting plate on which said shielding container is mounted.

4. The device in accordance with claim 2 wherein said shielding container is provided with opposite side walls; and at least two pivot bearings, each maintained in said opposite side walls of the shielding container and in contact with opposite sides of said head, said pivot bearings being disposed such a manner that an imaginary line drawn between the bearings would be substantially parallel to the running direction of the magnetic tape adjacent the head during operation of the apparatus.

5. The device in accordance with claim 4 wherein the pivot bearings are in the form of adjustble screws mounted in said opposite sidewalls.

6. The device in accordance with claim 4 wherein the magnetic head is provided with at least two bearing positions, each cooperates with a pivot bearing, with said positions being a sunk centre point or an inserted bearing head.

7. The device in accordance with claims 2 or 4 wherein the shielding container is provided with a rear portion and said adjustable limit means comprises two adjustment screws located on said rear portion whereby the degree of rotation of the magnetic head may be adjusted by the adjustment of said screws.

* * * * *